United States Patent
Kettemann et al.

(10) Patent No.: US 10,422,435 B2
(45) Date of Patent: Sep. 24, 2019

(54) DIAPHRAGM VALVE

(71) Applicant: BUERKERT WERKE GMBH & CO. KG, Ingelfingen (DE)

(72) Inventors: Ralf Kettemann, Neuenstein OT Kirchensall (DE); Marcel Konstandin, Oehringen (DE)

(73) Assignee: BUERKERT WERKE GMBH & CO. KG, Ingelfingen (DE)

( * ) Notice: Subject to any disclaimer, the term of this patent is extended or adjusted under 35 U.S.C. 154(b) by 0 days.

(21) Appl. No.: 15/844,770

(22) Filed: Dec. 18, 2017

(65) Prior Publication Data

US 2018/0172171 A1 Jun. 21, 2018

(30) Foreign Application Priority Data

Dec. 19, 2016 (DE) .......................... 10 2016 124 805

(51) Int. Cl.
*F16K 27/02* (2006.01)
*F16K 7/16* (2006.01)
*F16K 7/12* (2006.01)

(52) U.S. Cl.
CPC .......... *F16K 27/0236* (2013.01); *F16K 7/126* (2013.01); *F16K 7/16* (2013.01)

(58) Field of Classification Search
CPC ................................ F16K 27/0236; F16K 7/16
See application file for complete search history.

(56) References Cited

U.S. PATENT DOCUMENTS

| | | | |
|---|---|---|---|
| 2,892,613 A | 6/1959 | Boteler | |
| 2,988,322 A | 6/1961 | Anderson | |
| 3,091,427 A | 5/1963 | Boteler | |
| 3,628,770 A * | 12/1971 | Rost | F16K 7/126 251/331 |
| 4,596,268 A * | 6/1986 | Jonas | F16K 7/126 137/375 |
| 6,007,045 A * | 12/1999 | Heiniger et al. | F16K 7/126 251/331 |
| 9,366,346 B2 | 6/2016 | Matalon et al. | |
| 9,587,759 B2 * | 3/2017 | Matalon et al. | A61F 13/4902 |
| 9,638,339 B2 | 5/2017 | Schwetz et al. | |
| 2015/0167853 A1 | 6/2015 | Obara et al. | |
| 2015/0354718 A1 | 12/2015 | Schwetz et al. | |

FOREIGN PATENT DOCUMENTS

| | | |
|---|---|---|
| DE | 202013102526 U1 | 8/2013 |
| DE | 202014102658 U1 | 7/2014 |
| EP | 0897076 A1 | 2/1999 |

* cited by examiner

*Primary Examiner* — Kevin L Lee
(74) *Attorney, Agent, or Firm* — McNees Wallace & Nurick LLC

(57) ABSTRACT

A diaphragm valve including an axially driven valve spindle provides a pressure member, which allows to directly couple the diaphragm to the valve spindle. The same pressure member may always be used for coupling, irrespectively of the type of fastener, which is integrated in the diaphragm.

15 Claims, 5 Drawing Sheets

DIAPHRAGM VALVE

FIELD OF THE INVENTION

The invention relates to a diaphragm valve including an axially driven valve spindle.

BACKGROUND

Such a diaphragm valve is known from EP 0 897 076 A1. Said diaphragm valve is characterized in that in order to replace the diaphragm it is not required to disassemble the complete actuator. Rather, at first the upper part of the casing including the accommodated actuator therein has to be removed from the lower part of the casing which includes the valve seat. The diaphragm is screwed to a diaphragm support or coupled to a diaphragm support by using a bayonet connection. The diaphragm support includes an insertion groove by means of which the diaphragm support may be plugged onto a valve spindle. A pressure member is pushed on the diaphragm support which surrounds the diaphragm support and is adapted to press the complete area of the diaphragm against the valve seat, which normally extends in an arc shape. To this end, the pressure member has a convex shape on the front wall on the side of the diaphragm thereof and it may have a complementing shape corresponding to the valve seat. After plugging the diaphragm support onto the valve spindle, the pressure member which is made of plastics, is pushed up in order to secure the diaphragm support against a radial movement on the valve spindle.

The objective of the invention is to improve the known diaphragm valve in order to facilitate assembly and disassembly thereof. In addition, it is intended to fabricate the diaphragm valve in a more cost-efficient way.

SUMMARY

The present invention provides a diaphragm valve with an axially driven valve spindle, which is drivingly coupled to a diaphragm using a pressure member, wherein the pressure member has a front wall on the side of the diaphragm including a contoured front face directly opposite to the backside of the diaphragm and may be directly coupled to the valve spindle and decoupled from it by means of a plug connection, wherein a fastener is embedded into the diaphragm. The fastener projects on the backside of the diaphragm and by means of the fastener the diaphragm is mountable to the pressure member in a non-destructive manner.

As opposed to the state of art, the pressure member according to the invention is adapted to be directly pluggable on the valve spindle. Thus, the diaphragm may be removed from the valve spindle without having to disassemble the actuator. However, in the state of the art the attached pressure member has been falling down after screwing off or decoupling the diaphragm support from the fastener, which is disadvantageous especially during overhead mounting. In contrast, the pressure member according to the invention remains in the valve spindle, thus it may not fall down.

The pressure member may be radially pluggable into a groove in the valve spindle.

Preferably, the pressure member includes a cavity, which is accessible radially from outside via a radial recess and which is delimited on the side of the diaphragm by the first front wall and on the side of the valve spindle by a second front wall. In this cavity the valve spindle and also the fastener may project and engage with the respective front wall to implement an axial lock.

The second front wall is to include an insertion slot extending radially outwards, into which the valve spindle may be radially plugged in by means of a groove.

The pressure member is to be aligned in circumferential direction with respect to against the rest of the valve in order to ensure the position of the pressure member in relation to the valve seat. Hereto, according to an embodiment of the invention, it is provided that radial projecting arms are provided on the pressure member in the region of the front wall on the side of the diaphragm. These arms are in particular an one-piece integral part of the pressure member.

Preferably, the arms extend basically 90° to the radial recess, as viewed in the axial direction of the valve spindle, thus they do not interfere during a replacement of the diaphragm by the operator.

The front wall on the side of the diaphragm may have an opening for the fastener to pass through. The opening includes a centric portion and slots extending from the centric portion in diametrically opposite directions. The end portion of the fastener projecting through the front wall engages behind the front wall by the retainer. In the diaphragm valve according to the invention, due to the particular shape of the opening, a screwing connection and also a bayonet connection may be used for coupling the pressure member directly to the fastener. That means, that the pressure member may be used in an all-purpose way, and it is not required to use different pressure members or different diaphragm supports as in the state of the art.

In the region of the radial recess opposite of the centric portion of the opening, the first front wall projects radially outwards to a smaller extent than in the rest of the region. In particular, the first front wall is flattened in the region of the radial recess. This geometry enables an easier access to the cavity, which facilitates the replacement of the diaphragm, or it is possible that a retainer, which will be explained in the following, partly projects from the cavity in order to be able to grasp the diaphragm more easily and to facilitate the disassembly of the diaphragm from the valve spindle.

On the end portion of the fastener protruding through the front wall on the side of the diaphragm laterally projecting bayonet protrusions may be mounted, which are mounted integrally as one part or may be formed by one or several separate parts. Said bayonet protrusions form the retainer. Thus the fastener in combination with the pressure member forms a bayonet fastening. As opposed to the state of the art, no diaphragm support is required here. Instead, the fastener is directly coupled to the pressure member.

A very simple variant of embodying this bayonet fastener is to form the bayonet protrusions by means of a pin. Said pin protrudes through the end portion of the fastener and projects radially with the ends thereof opposite to said end portion.

A second way of fastening the diaphragm on the pressure member is that the end portion of the fastener includes an external thread, which is screwed into a retaining part arranged in the pressure member and which may be removed from the pressure member in a non-destructive manner.

Said retaining part may for example comprise a base part, in particular made of plastics, and a nut accommodated in the base part, made for example of metal. The fastener is then screwed into said nut. Such a retaining part, which may be made of different materials, may be produced in a very cost-efficient way and also in a relative simple way, which facilitates fast switching of the valve by reducing the inert mass.

Said retaining part may be inserted via the above-mentioned radial recess in the above-mentioned cavity, which is radially accessible from outside and may be non-rotatably coupled to the pressure member in the cavity. That means, the pressure member may be rotated in relation to the diaphragm and during said rotation the pressure member carries the retaining part with it.

The retaining part is in particular formed as a plate including two opposite flat sidewalls, which are configured to carry the retaining part with them during the rotation.

For assembly and in particular for disassembly it is advantageous, when the retaining part protrudes radially outwards opposite of the front wall on the side of the diaphragm, in particular in the region of the portion mentioned before, which radially protrudes to a less far extent. At this projecting portion the retaining part may then be grasped and pulled outwards.

For said disassembly of the retaining part, a disassembly recess in the retaining part in the region of the radial outer edge of the front wall on the side of the diaphragm has proven to be advantageous. Then, for example a screwdriver or another tool may be inserted in this disassembly recess and pressed against the radial outer edge, thus a lever effect is achieved.

During disassembly and also during assembly it is important that it may be performed overhead, because diaphragm valves are often mounted at very hard to access places, which provide no view of the situation. In this context it is advantageous that at least one resilient retaining finger, preferably several resilient retaining fingers, laterally protrude(s) from the retaining part. Such a retaining finger is to couple the pressure member and the retaining part securely together in a unit which may be preassembled. That means, in case the pressure member is removed from the diaphragm, the retaining part may not "drop off", or position itself in another place in the cavity in the pressure member or get jammed.

DETAILED DESCRIPTION

Figure 1:
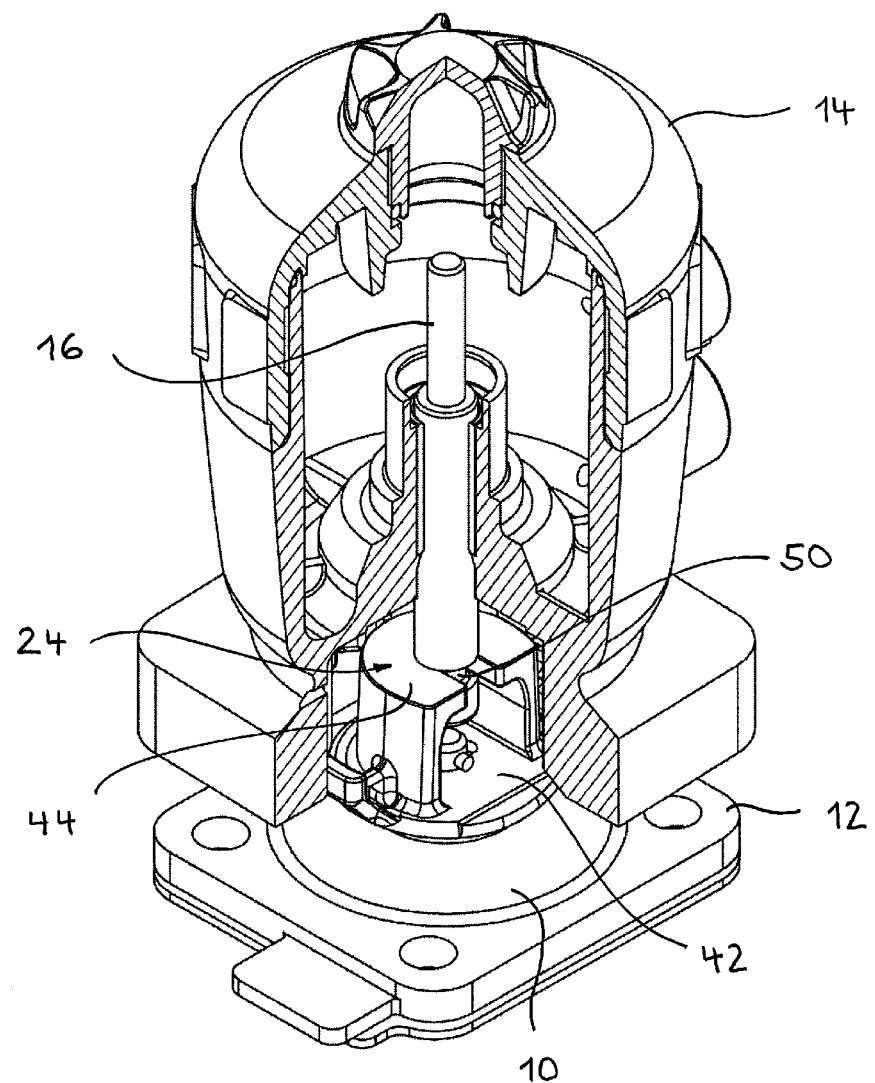
FIG. 1 shows a partial perspective section view through a first embodiment of the diaphragm valve according to the invention.

In FIG. 1 a diaphragm valve is shown, which may be driven in a hydraulical, pneumatic or electric way. The diaphragm valve comprises a diaphragm 10 including a resilient circular middle part and clamping flanges 12 by means of which the diaphragm 10 is clamped. The diaphragm 10 will be replaced in case the diaphragm 10 is defect. On the flange part 12 an actuator 14 is fastened during operation. The actuator 14 may be a hydraulic, pneumatic or electric actuator, as already mentioned above. The actuator 14 is further a preassembled self-contained unit.

Figure 4:
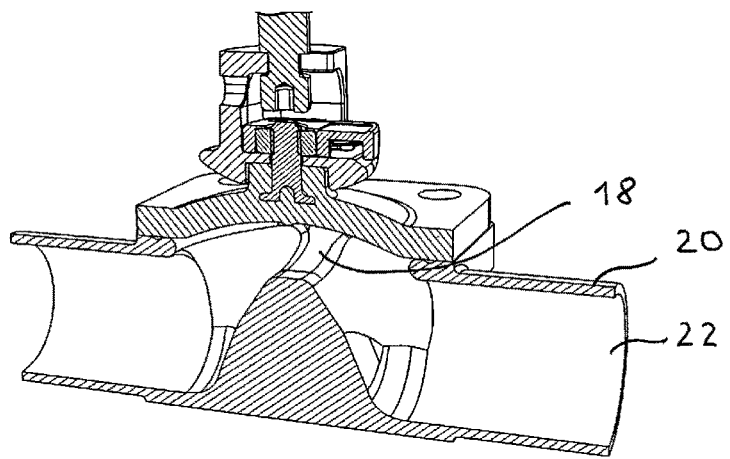
FIG. 4 shows a longitudinal section view through the enclosure where fluid is flowing through including a diaphragm and pressure member according to a second embodiment of the diaphragm valve according to the invention.

A valve spindle 16, which may be moved axially by the actuator 14, is moved up and down in order to lift or lower the diaphragm 10, and thus press it against a valve seat 18 (see FIG. 4), which is formed in a so-called fluid housing 20. Thus, the flow section of the respective pipe 22 may be opened to a larger or smaller degree.

Figure 5:
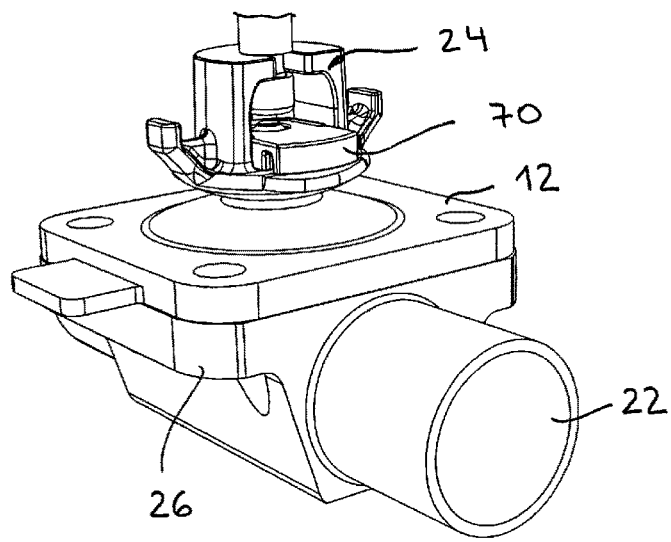
FIG. 5 shows a perspective view of the components according to FIG. 4.

The valve spindle 16 may be coupled to and decoupled from the diaphragm 10 by means of a pressure member 24 in a non-destructive way and preferably also without using tools. Said coupling and decoupling is performed without disassembly of the actuator 14. For disassembly, only the actuator 14 has to be removed from the fluid housing 20, which comprises a respective flange 26 (see FIG. 5) by means of which the actuator 14 and thus also the diaphragm 10 may be clamped to the flange 26. After removing of the actuator 14 from the flange 26, the diaphragm 10 may then be replaced, as will be described in the following.

The diaphragm 10 includes an integrated fastener 28 (see FIG. 2), in particular during pressing/moulding or injecting of the diaphragm 10, which projects on the backside of the diaphragm 10. The fastener 28 is preferably formed in the shape of a pin. At a predetermined distance from the diaphragm 10, here from an socket 30 that projects from the backside of the diaphragm, ends of a pin 32, which protrude through the fastener 28, are laterally projecting. Said ends form a retainer for the pressure member 24. The ends may also be formed integrally as one-piece on the protrusions formed on the fastener 28.

Figure 2:
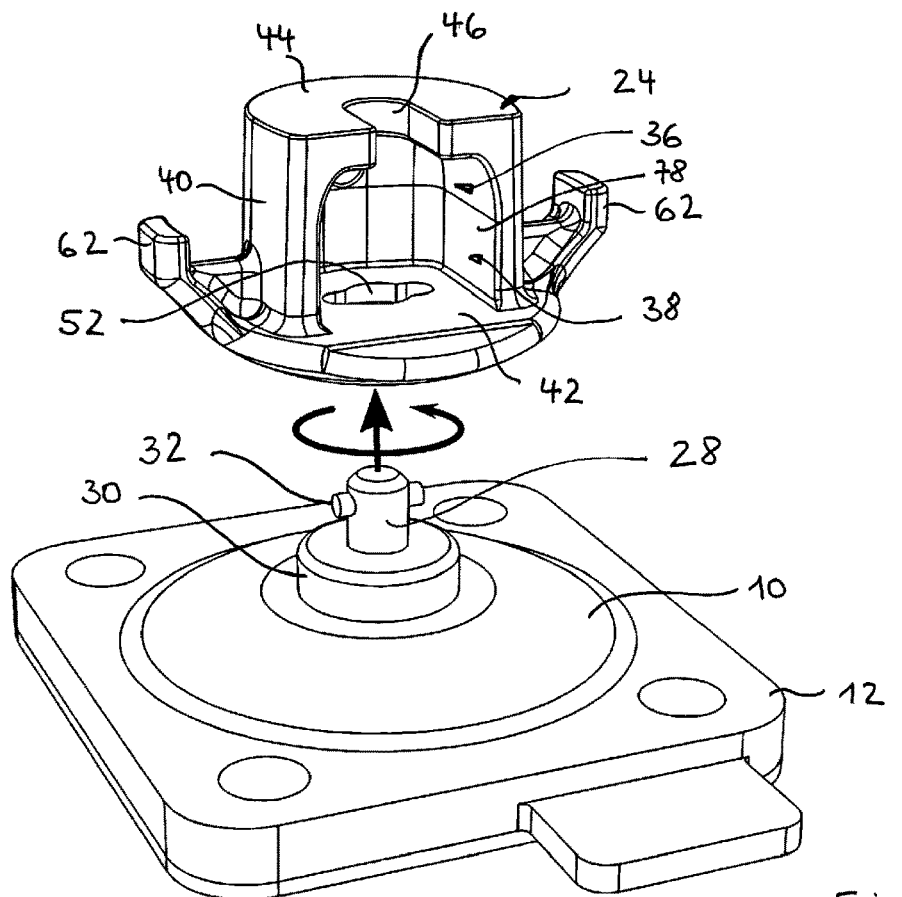
FIG. 2 shows a perspective view of the pressure member including the diaphragm shown in FIG. 1 before the assembly thereof.
Figure 3:
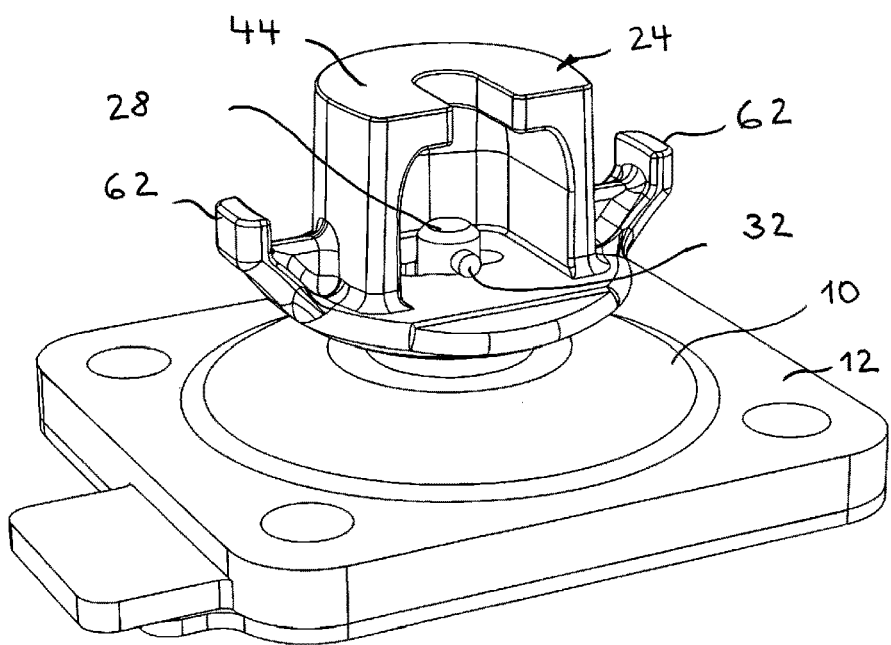
FIG. 3 shows a pressure member and diaphragm according to FIG. 2 in a mounted state.

The portion of the fastener 28, which projects on the backside opposite of the diaphragm 10 and here also from the socket 30, is denoted as end portion of the fastener 28. This end portion is formed in combination with the pin 32 as part of a bayonet connection. By means of said bayonet connection, the fastener 28 and thus the diaphragm 10 is directly locked to the pressure member 24. This is shown in FIGS. 2 and 3.

Basically, the pressure member 24 has a cylindrical shape and a cavity 36, which may be accessed by a radial recess 38 radially from the side. Said recess is only provided on one side of the cavity 36. Apart from that, the cavity 36 is axially delimited by a peripheral wall 40 and by a first front wall 42 on the side of the diaphragm, and an opposite second front wall 44. The first front wall 42 is located opposite to the diaphragm 10, and the second front wall 44 is assigned to the valve spindle 16 in order to be fastened thereto.

For fastening to the valve spindle 16, the second front wall 44 includes a radial insertion slot 46, which extends up to the edge of the second front wall 44, so that it is accessible radially from outside.

The valve spindle 16 has a groove 50, shown in FIG. 1, which width corresponds to the axial thickness of the second front wall 44, and in the region of the groove 50 an inner diameter, which basically corresponds to the width of the insertion slot 46. Thus, the pressure member 24 may be pushed on the end of the valve spindle 16 on the side of the diaphragm radially from outside. By means of these coupling the unit consisting of diaphragm 10 and pressure member 24, which is described in the following, may easily be decoupled from the valve spindle 16 and pushed on it again.

The bayonet connection already mentioned above between the diaphragm 10 and the pressure member 24 is realized in that the pressure member 24 has a central opening 52 in the first front wall 42, through which the fastener 28 including the retainer adapted as pin 32 may be inserted in a predetermined rotational position (see axial arrow in FIG. 2)

Figure 10:
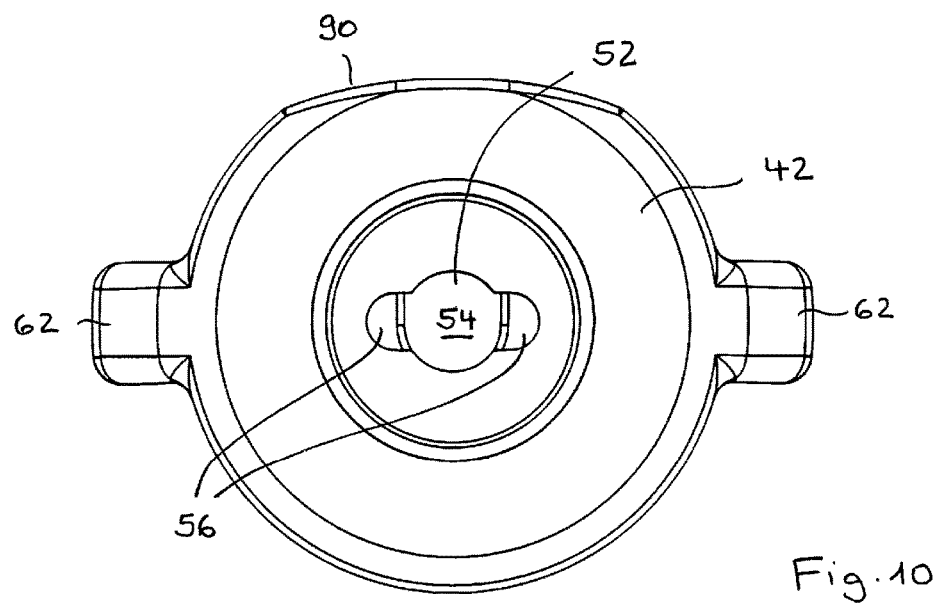
FIG. 10 shows a subordinated view of the pressure member used in the diaphragm valve according to the embodiments.

The cavity 52 in the first front wall 42 is shown in FIG. 10. The cavity 52 comprises a middle centric region 54 and slots 56 extending diametrically outwards from the centric region 54, which are adapted to pass the end of the pins through it.

In order to lock the diaphragm 10 on the pressure member 24, after passing-through the end portion of the fastener 28, a relative rotation between the pressure member 24 and the diaphragm 10 is performed, preferably at 90°. Thus, a lock in the axial direction is achieved.

It should also be noted that the front wall 42 on the front face 58 facing the diaphragm 10 (see for example FIG. 9) is formed in a convex shape in order to enable a tight closure during pressing the diaphragm 10 onto the valve seat 18 by using a complementary shape of the front face 58.

The mounted state is then shown in FIG. 3.

Preferably, the pressure member 24 is axially biased by means of the bayonet connection against the socket 30.

In order to align the pressure member 24 at the periphery in relation to the valve, here in particular to the valve seat 18, radially projecting arms 62, which extend in diametrically opposite directions, are formed on the pressure member 24 in the region of the first front wall 42 (front wall on the side of the diaphragm). Starting from the first front wall 42, said arms 62 may also be increasingly spaced apart and extend obliquely from the diaphragm 10 to the free end thereof and merge into axial end portions, as shown in FIGS. 2 and 3. As seen in the axial direction (axial direction is the axis direction of the valve spindle 16), the arms 62 extend basically 90° to the peripheral center of the recess 38.

In the embodiment according to FIGS. 4 to 9, no bayonet connection is provided between the pressure element 24 and the fastener 28. Instead the fastener 28 includes an external thread on the end portion thereof (see FIG. 4). The end portion protrudes through the centric portion 54 of the opening 52 and has a diameter, which is larger than the width of the slots 56, thus the end portion may not be moved into the slots 56.

The end portion then protrudes into the cavity 36 and is here secured by the retainer adapted as a so-called retaining part 70. Said retaining part 70 comprises a base part 72, for example made of plastics, and a nut 74 inserted into the respective recess or even inserted in a captive way by press-fitting (see FIGS. 6 and 9).

Figure 9:
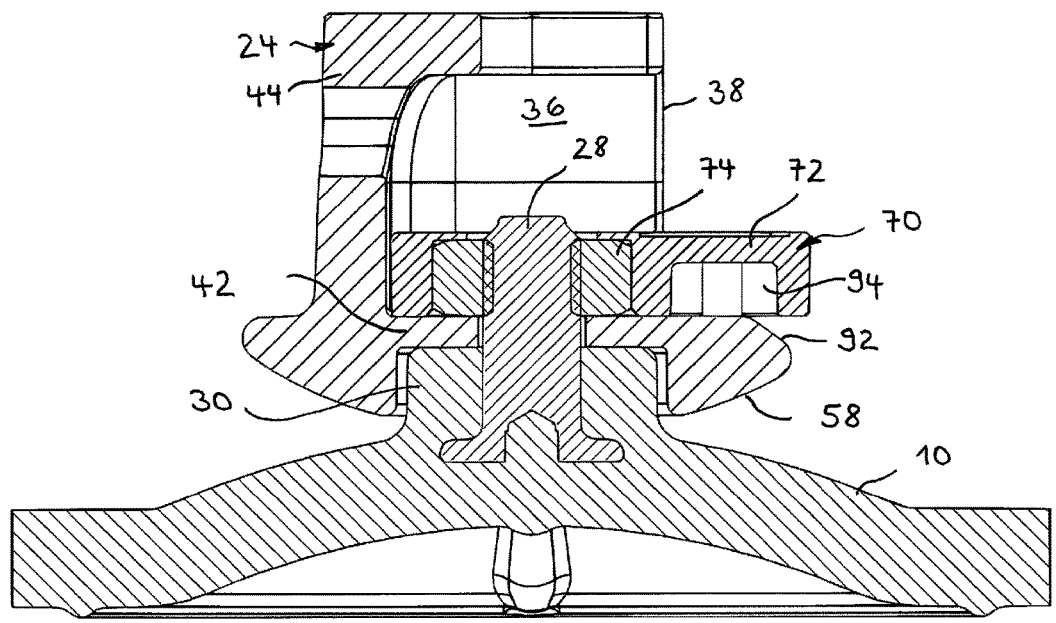
FIG. 9 shows a section view through the assembled components according to FIG. 8.

Thus, the external thread is screwed into the nut 74, as shown in FIG. 9. Thereby, the retaining part 70 clamps the pressure member 24 against the diaphragm 10, more particularly against the socket 30. The pressure member 24 has a recess on the front face 58 thereof in order to accommodate the socket 30 in the front wall 42, as shown in FIG. 9.

Figure 6:
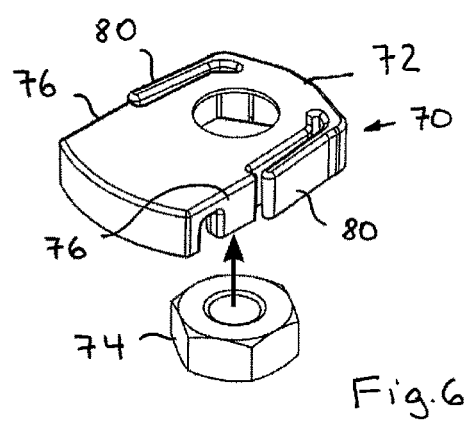
FIG. 6 shows in a perspective view a retaining part inserted in the diaphragm valve according to FIG. 4.

The base part 72 is configured plate-shaped having to two flat sides 76 opposed to each other (see FIG. 6). The peripheral wall 40 has on the inner side, which delimits the cavity 36, respective flat sides 78 (see FIG. 1), where the flat sides 76 may abut, so that during insertion into the cavity 36 the base part 72 is non-rotatably coupled with the pressure member 24.

On the flat side 76 integrally formed resilient holding fingers 80 protrude laterally from the retaining part 72, which press against the inner side of the peripheral wall 40, so that the pressure member 24 and the retaining part 70 form a preassembled unit, where the retaining part 70 is captively mounted to the pressure member 24.

Figure 7:
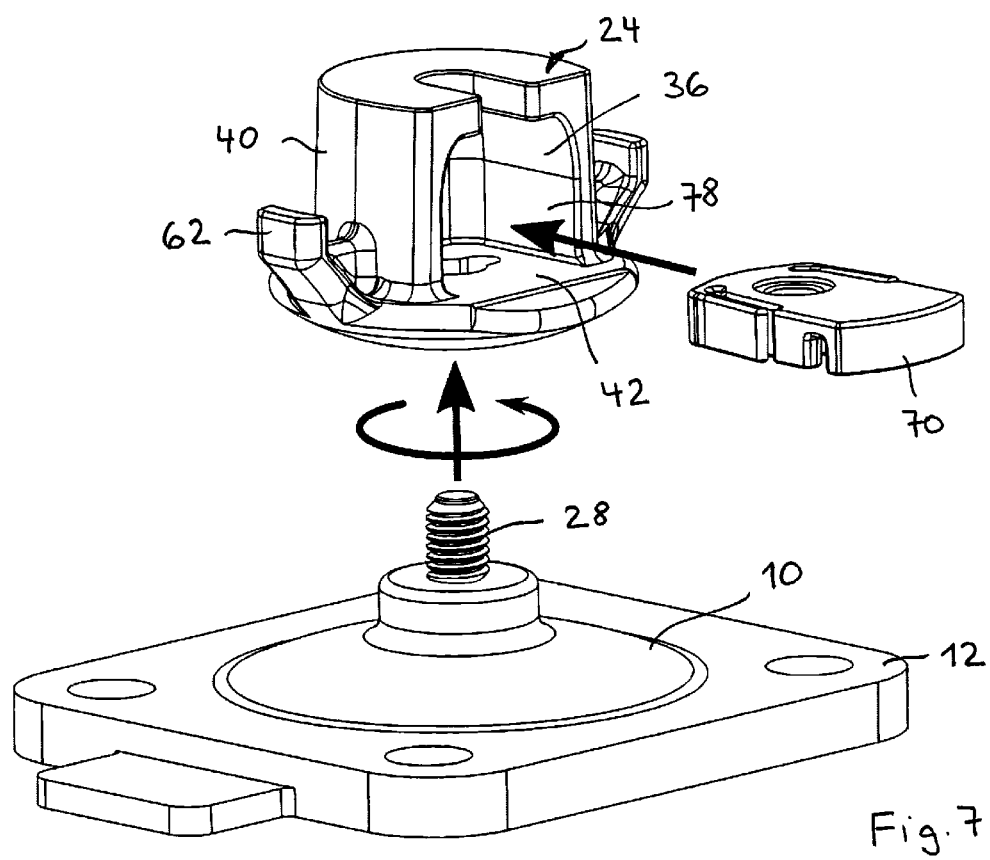
FIG. 7 shows the pressure member provided at the diaphragm according to FIG. 4 including the retaining part and diaphragm during assembly.

For assembly reference is made to FIG. 7. At first, the retaining part 70 is pushed into the cavity 36 of the pressure member 24, where it abuts on the upper side of the front wall 42. In the assembled position, the nut 74 is aligned with the centric region 54 of the opening 52.

It should be noted, that the pressure member 24 remains the same for both different fastening types, that is bayonet connection and screwing connection.

Figure 8:
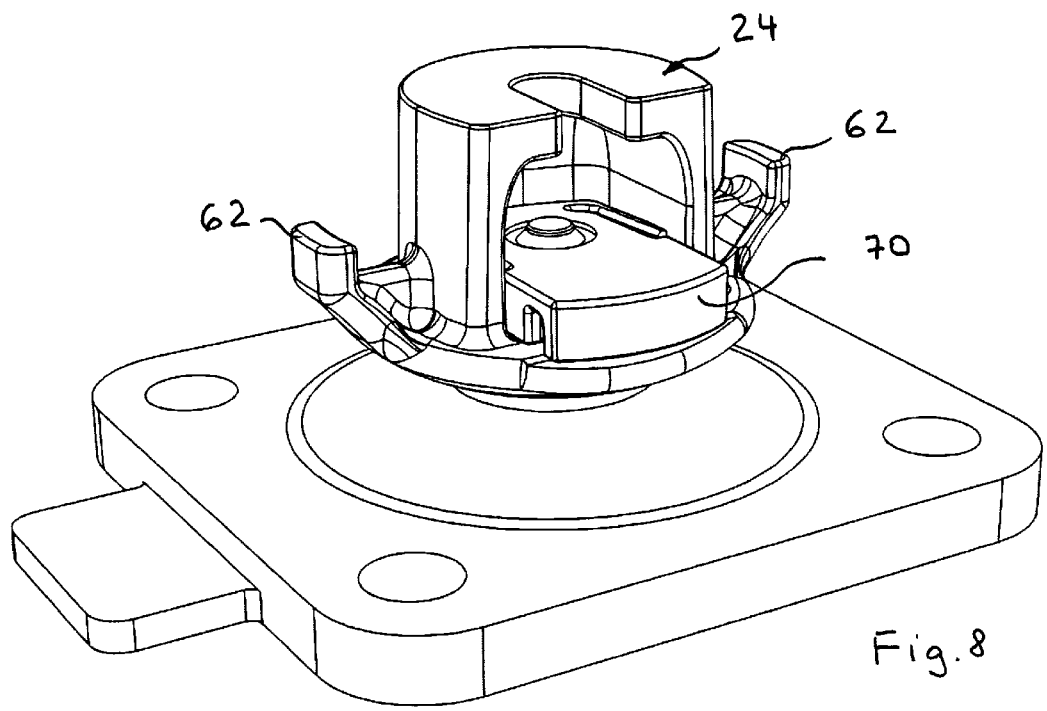
FIG. 8 shows the components shown in FIG. 7 in an assembled state.

Then, the diaphragm 10 and the pressure member 24 are screwed in relation to one another (see arrow in FIG. 7), and the diaphragm 10 is secured t the pressure member 24 (see FIG. 8). In an assembled state, the arms 62 then project laterally aligned in the peripheral direction.

For disassembly of the retaining part 70 from the pressure member 24 some special features are provided, which will be explained in the following. Thus, the retaining part 70, as shown in FIG. 9, projects laterally opposite to the front wall 42 in this region. Said region is also the region of the radial recess 38. As can be seen in FIG. 10, the front wall 42 radially projects in the region of the radial recess 38 opposite of the centric region 54 less far than in the remaining region. Here a flattening 90 may also be provided.

When viewed in a cross-section view, the front wall 42 has in the region of the flattening 90 a flaring-type outer edge 92, which is adapted for applying a lever by means of disassembly tool. As It can be seen in FIG. 9, the retaining part 70 includes a disassembly recess 94 on the lower side thereof, which is provided in the region of the radial outer edge 92 and radially projects further outwards than the respective contact surface of the retaining part 70 on the upper side of the front wall 42. Thus, a tool may be inserted in the assembly recess 94 from below and push the retaining part 70 radially out of the cavity 36 by using the lever on the outer edge 92.

The invention claimed is:

1. A diaphragm valve including an axially driven valve spindle, which is drivable coupled to a diaphragm by means of a pressure member, wherein the pressure member has a front wall on the side of the diaphragm including a contoured front face directly opposite to the backside of the diaphragm, the pressure member being directly coupleable and decoupelable to the valve spindle by a plug connection, wherein a fastener is embedded into the diaphragm, the fastener projecting on the backside of the diaphragm, the diaphragm being mountable to the pressure member in a releasable manner by the fastener, wherein the front wall on the side of the diaphragm includes an opening, through which the fastener can be passed through, the opening including a centric region and slots starting at the centric region and extending in diametrically opposite directions, and wherein a retainer is provided on an end portion of the fastener, which penetrates through the front wall on the side of the diaphragm, end portion engaging behind the front wall, and wherein the fastener extends through the centric region of opening in the front part and has an end portion comprising an external thread, which is screwed into a retaining part which is accommodated in the pressure member and which is removable from the pressure member in a non-destructive manner.

2. The diaphragm valve according to claim 1, wherein the pressure member is adapted to be radially inserted in a nut in the valve spindle.

3. The diaphragm valve according to claim 1, wherein the pressure member includes a cavity, which is accessible by means of a radial recess radially from outside, the cavity being delimited on the side of the diaphragm by the front wall on the side of the diaphragm, which forms a first front wall, and on the side of the valve spindle by a second front wall.

4. The diaphragm valve according to claim 3, wherein the pressure member is adapted to be radially inserted in a nut in the valve spindle and wherein the second front wall includes an insertion slot extending radially outwards, into which the valve spindle with the groove is adapted to be radially inserted.

5. The diaphragm valve according to claim 1, wherein radially projecting arms are provided on the pressure member in the region of the front wall on the side of the diaphragm in order to align the pressure member with the diaphragm valve in circumferential direction.

6. The diaphragm valve according to claim 5, wherein the pressure member includes a cavity, which is accessible by means of a radial recess radially from outside, the cavity being delimited on the side of the diaphragm by the front wall on the side of the diaphragm, which forms a first front wall, and on the side of the valve spindle by a second front wall, and wherein the arms extend 90° to the radial recess, when viewed in the axial direction of the valve spindle.

7. The diaphragm valve according to claim 1, wherein the pressure member includes a cavity, which is radially accessible from outside via a radial recess, and that the front face on the side of the diaphragm projects outward to a smaller extend in the region of the radial recess opposite to the centric region of the opening than in the remaining region.

8. The diaphragm valve according to claim 7 wherein the front wall on the side of the diaphragm is flattened in the region of the radial recess.

9. The diaphragm valve according to claim 1, wherein on an end portion of the fastener, which protrudes through the front wall on the side of the diaphragm, laterally projecting bayonet protrusions are mounted, which form the retainer so that a fastener forms in combination with the pressure member a bayonet connection.

10. The diaphragm valve according to claim 9, wherein the bayonet protrusions are formed by a pin penetrating through an end portion of the fastener.

11. The diaphragm valve according to claim 1, wherein the retaining part includes a base part and a nut, which is accommodated in the base part, the fastener being screwed into the nut.

12. A diaphragm valve including an axially driven valve spindle, which is drivable coupled to a diaphragm by means of a pressure member, wherein the pressure member has a front wall on the side of the diaphragm including a contoured front face directly opposite to the backside of the diaphragm, the pressure member being directly coupleable and decoupelable to the valve spindle by a plug connection, wherein a fastener is embedded into the diaphragm, the fastener projecting on the backside of the diaphragm, the diaphragm being mountable to the pressure member in a releasable manner by the fastener, wherein the end portion of the fastener comprises an external thread, which is screwed into a retaining part which is accommodated in the pressure member and which is removable from the pressure member in a non-destructive manner, and wherein the retaining part is adapted to be inserted in a cavity of the pressure member via a radial recess in the pressure member, the cavity being accessible radially from outside, and the retaining part being coupled to the pressure member in a non-rotatably manner in the cavity.

13. The diaphragm valve according to claim 1, wherein the retaining part projects radially outwards opposite of the front wall on the side of the diaphragm.

14. The diaphragm valve according to claim 13, wherein the retaining part includes a disassembly recess in the region of a radial outer edge of the front wall on the side of the diaphragm.

15. A diaphragm valve including an axially driven valve spindle, which is drivable coupled to a diaphragm by means of a pressure member, wherein the pressure member has a front wall on the side of the diaphragm including a contoured front face directly opposite to the backside of the diaphragm, the pressure member being directly coupleable and decoupelable to the valve spindle by a plug connection, wherein a fastener is embedded into the diaphragm, the fastener projecting on the backside of the diaphragm, the diaphragm being mountable to the pressure member in a releasable manner by the fastener, wherein the end portion of the fastener comprises an external thread, which is screwed into a retaining part which is accommodated in the pressure member and which is removable from the pressure member in a non-destructive manner, and wherein at least one resilient holding finger laterally protrudes from the retaining part, the holding finger coupling the pressure member and the retaining part captively together in an unit, which may be preassembled.

* * * * *